United States Patent [19]

Socha

[11] Patent Number: 4,968,550

[45] Date of Patent: Nov. 6, 1990

[54] WIRE BRAID REINFORCED INDIUM

[75] Inventor: Paul A. Socha, Whitesboro, N.Y.

[73] Assignee: Indium Corporation of America, New Hartford, N.Y.

[21] Appl. No.: 341,074

[22] Filed: Apr. 20, 1989

[51] Int. Cl.⁵ .............................................. B32B 3/10
[52] U.S. Cl. ....................................... 428/137; 428/75; 428/76; 428/263; 428/285; 428/457; 428/458; 428/461; 428/608; 428/614; 428/642; 428/192; 428/246
[58] Field of Search ................... 428/137, 76, 75, 285, 428/263, 457, 458, 461, 608, 614, 642, 192, 246

[56] References Cited

U.S. PATENT DOCUMENTS

| | | | |
|---|---|---|---|
| 1,853,175 | 4/1932 | Oven | 428/137 |
| 2,071,322 | 2/1937 | Balfe | 428/137 |
| 4,061,837 | 12/1977 | Hutkin | 428/609 |
| 4,078,299 | 3/1978 | Furuto et al. | 29/599 |
| 4,333,975 | 6/1982 | Booth | 428/457 |
| 4,423,120 | 12/1983 | Paulus et al. | 428/614 |
| 4,443,517 | 4/1984 | Shah | 428/457 |
| 4,470,184 | 9/1984 | Fukuoka et al. | 427/383.7 |
| 4,485,138 | 11/1984 | Yamamoto et al. | 428/457 |
| 4,547,435 | 10/1985 | Yamatsuta et al. | 428/614 |

FOREIGN PATENT DOCUMENTS 1545783  5/1979  United Kingdom ............... 428/137

Primary Examiner—Marion C. McCamish
Attorney, Agent, or Firm—Wall and Roehrig

[57] ABSTRACT

An indium-metal braid-indium sandwich is formed by applying indium ribbons to upper and lower surfaces of a metal braid and then working the sandwich, e.g., between rollers. The resulting product has enhanced tensile strength and stiffness, yet retains the attributes of indium for application as a gasket, gland, or seal.

5 Claims, 2 Drawing Sheets

WIRE BRAID REINFORCED INDIUM

BACKGROUND OF THE INVENTION

This invention relates to metal foils and the like, and is more particularly directed to sheets formed of indium metal.

Indium is employed in a wide variety of applications because of its beneficial properties of slipperiness, soft cold ductility, ability to cold weld to itself, and wetability. Because indium is soft and easily worked over a wide range of temperatures, including cryogenic and room temperature, it is often employed as a material for gaskets or glands. Indium gaskets perform well as mechanical, or electrical seals. Indium, being soft and pliable, deforms into voids at the interface of parts to be joined where the gasket is fitted. Indium seals are often used in electronics equipment and are excellent for minimizing electromagnetic interference (EMI) and radio frequency interference (RFI).

On the other hand, flat sheets or ribbons of indium are extremely flaccid, and this makes indium sheet material difficult to handle and inconvenient to employ. Indium is so soft that it will sag or flop when handled as a flat sheet or as a gasket preform. Also, indium is relatively expensive as compared with other metals such as copper.

OBJECT AND SUMMARY OF THE INVENTION

It is an object of this invention to provide a sheet material formed of indium which is suitable for gaskets, preforms, and other uses, and which avoids the drawbacks of conventional indium sheet material.

It is another object to provide indium sheet material which is rather stiff compared with pure indium sheet, yet retains the beneficial attributes of indium.

It is yet another object of this invention to provide a sheet material which employs a reduced amount of indium.

In accordance with an aspect of this invention, a flat braid is impressed with a sheet of indium, and the indium permeates the braid and self-welds. Alternatively, a closed mesh could be used if the indium layers are to be kept separate. The braid and indium can be worked between rollers into a flat sheet suitable for forming gaskets or preforms, or for other uses. Preferably, there are two ribbons of indium sandwiching a metal braid which is worked into a flat foil. The indium from each side works into and through voids and interstices in the braided or woven filaments of the braid, and welds to indium material from the other side. Also, when the sheet is cut or punched into gaskets, thin plates, in other flat objects, the indium metal at the cut edge will self-weld around ends of the filaments, leaving a relatively smooth edge.

The braid is preferably of metal such as copper, or other metal mesh, but can be mesh of glass or polymeric fibers. The term "braid" is meant to include substrates of braided, woven, or non-woven filaments.

The resulting foil is relatively stiff and maintains its shape in ordinary handling, but retains the benefits of indium when put into service. Also, the presence of the braid filaments results in less indium being needed than for foils of similar thickness formed of pure indium or of high indium alloy. These sheets have a high degree of wetability, and can be employed in any environment where solder is to be flowed onto the sheet or adhered to it.

The above and many other objects, features, and advantages of this invention will be more fully appreciated from the ensuing description of a preferred embodiment which is to be read in connection with the accompanying Drawing.

DETAILED DESCRIPTION OF A PREFERRED EMBODIMENT

Figure 1:
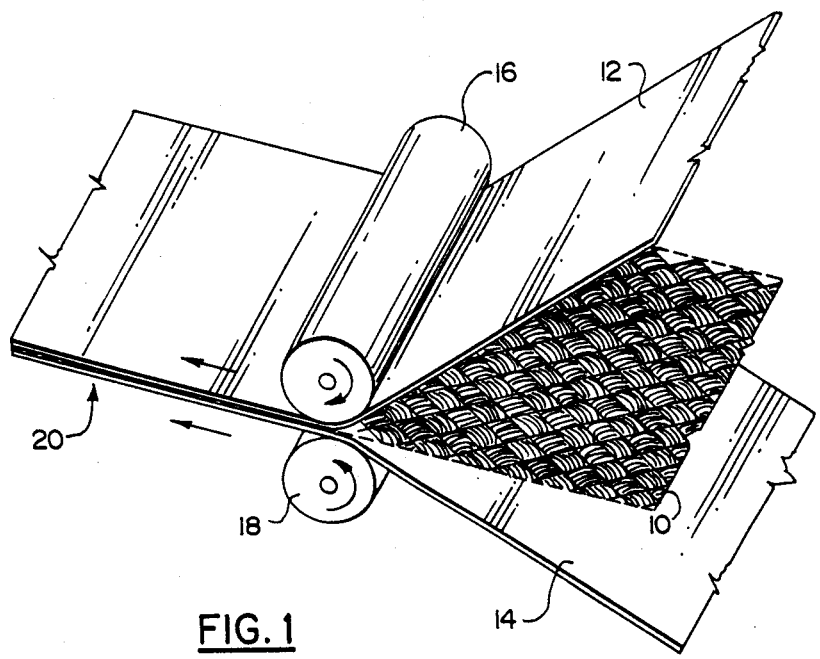
FIG. 1 is a perspective view of a shell or strip of braid being covered with layers of indium.
Figure 2:
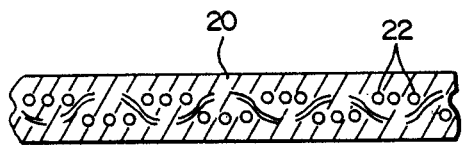
FIG. 2 is a cross section of the sheet or strip prepared as in claim 1.

With reference to the Drawing, a method of producing the indium-braid sandwich material of this invention can be explained in connection with FIG. 1. A braid 10, i.e. a sheet of braided or woven filaments is suitably cleaned and pretreated, and is coated with upper and lower layers 12, 14 of indium ribbon. The assembly of the braid 10 with the upper and lower indium ribbons 12, 14 is worked between upper and lower pressure rollers 16, 18 to produce an indium/braid/indium sandwich 20, shown in cross section in FIG. 2. The resulting sandwich 20 is of thickness that can be greater than, equal to, or less than that of the original braid 10.

The indium of the ribbons 12, 14 is self-welding. That is, the working of the material between the rollers 16, 18 flows the indium through voids and interstices between filaments 22 of the braid 10, and then unites the indium from the ribbon 12 with the indium from the ribbon 14. This completely buries the filaments 22 in indium. The sandwich 20 has smooth indium faces. Also, when the sandwich 20 is cut, the indium flows at the edges to cover any filament ends at the edges.

Figure 3:
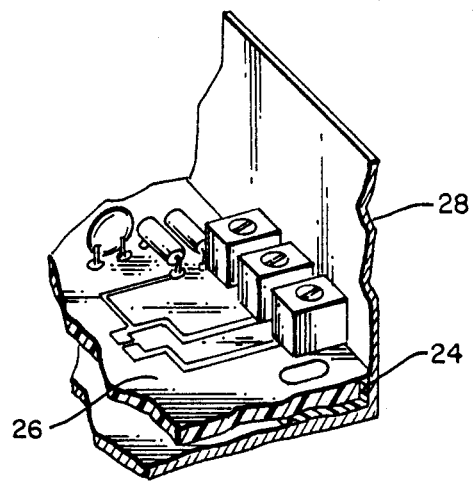
FIG. 3 is a perspective view of one application of a preferred embodiment of this invention.
Figure 4:
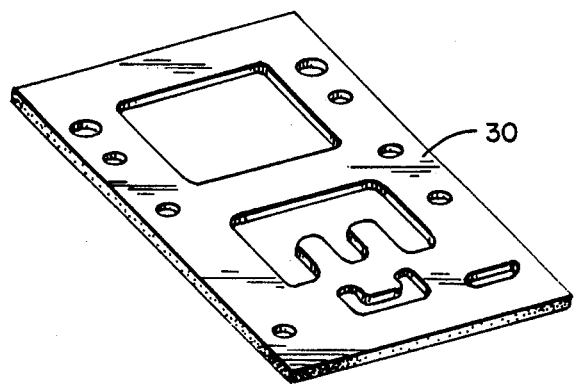
FIG. 4 shows another embodiment of the invention.

The indium braid sandwich can be employed as a conductive foil tape 24 as shown in FIG. 3. Here the tape 24 is a situated between a printed circuit board 26 and a chassis 28 to establish conductive contact between the board 26 and the chassis 28 to absorb any stray electromagnetic interference (EMI). As shown in FIG. 4, a gasket or gland 30 can be punched or die cut. This gasket is stiff but flexible, and will hold its shape and dimension until installed.

The braid 10 employed here is a steel mesh, but the invention is not limited to that. Instead, the braid could be filaments of other metals, or could be glass fiber cloth, or a synthetic resin such as polytetrafluroethylene or nylon. Also, the braid can be additionally perforated to permit the indium to flow through. Also, rather than being worked, the indium ribbons could be furnace reflowed.

Also, the sheet can be formed with the indium ribbon applied to only one side of the braid, or with indium applied to one side and another material such as a solder applied to the other.

The term "indium" employed in this text encompasses both pure indium metal and also alloys of indium.

The handling attributes of the sandwich material has the benefits of indium, but significantly increased tensile strength as compared with normal indium ribbon or sheet. The sheets are suitable for forming large or small preforms. This product can be employed whenever handling of indium metal is a concern. Washers and glands made of this material employ less indium than was previously possible.

While the invention has been described with reference to a preferred embodiment, the invention is certainly not limited to that precise embodiment. Rather, many modifications and variations are possible without departing from the scope and spirit of this invention, as defined in the appended claims:

What is claimed is:

1. A flexible sheet material comprising a flat braid layer formed of a plurality of filaments of metal, glass, or polymeric fibers, and at least one layer of indium impressed into said braid layer, with the indium impregnating the filaments and self-welding over them, the sheet material having the property that when it is cut to define a cut edge, the indium metal self welds around cut ends of the filaments at the cut edge.

2. The flexible sheet material of claim 1 wherein there are first and second indium layers, with said braid layer being sandwiched therebetween.

3. The flexible sheet material of claim 1 wherein said flat braid layer is a metal braid.

4. A flexible metal sheet material comprising a flat metal braid layer formed of a plurality of metal filaments, and first and second layers of indium impressed directly against said braid layer with the braid sandwiched therebetween, such that the indium impregnates the metal filaments and self-welds over them, the sheet material having the property that when it is cut to define a cut edge, the indium metal self-welds around the cut ends of the filaments at the cut edge.

5. An electrically conducted sheet material formed as a ribbon of metal braid sandwiched between a pair of indium ribbon layers, with the indium penetrating interstices in said metal braid to unite the indium of one of the ribbons with the indium of the other of the ribbons, the sheet material having he property that when it is cut to define a cut edge, the indium metal self-welds around the cut ends of the filaments at the cut edge.

* * * * *